United States Patent [19]
Churchill

[11] Patent Number: 5,111,367
[45] Date of Patent: May 5, 1992

[54] FIBER OPTIC LIGHTING DEVICE

[76] Inventor: David L. Churchill, 2200 Rte. 301, Unit 5, Palmetto, Fla. 34221

[21] Appl. No.: 777,156

[22] Filed: Oct. 16, 1991

[51] Int. Cl.$^5$ .............................................. F21V 7/04
[52] U.S. Cl. ...................................... 362/32; 362/218; 362/264; 362/293; 362/373
[58] Field of Search ................. 362/32, 218, 224, 264, 362/293, 294, 373

[56] References Cited

U.S. PATENT DOCUMENTS

| | | | |
|---|---|---|---|
| 3,255,342 | 6/1966 | Seitz et al. | |
| 3,279,317 | 10/1966 | Ploke | |
| 3,455,622 | 7/1969 | Cooper | |
| 3,463,914 | 8/1969 | Lutter | |
| 3,586,851 | 6/1971 | Rudolph | |
| 3,681,592 | 8/1972 | Hugelshofer | 362/32 |
| 4,563,589 | 1/1986 | Scheffer | 362/218 X |
| 4,740,870 | 4/1988 | Moore et al. | 362/32 |
| 4,766,526 | 8/1988 | Morimoto et al. | 362/255 |
| 4,937,714 | 6/1990 | Witt | 362/255 |
| 4,958,263 | 9/1990 | Davenport et al. | 362/32 |
| 5,001,616 | 3/1991 | Gehly et al. | 362/308 |
| 5,016,152 | 5/1991 | Awai et al. | 362/293 |

*Primary Examiner*—Stephen F. Husar
*Attorney, Agent, or Firm*—Charles J. Prescott

[57] ABSTRACT

A fiber optic lighting device for providing a light source against and into one end of a fiber optic bundle for use. The device includes a long-life arc lamp which is operably connected within a tubular heat sink. At least one rigid transparent elongated, preferably cylindrical member having ground and polished ends is connected within a mating opening in the heat sink facing the arc lamp, light emitting from the arc lamp passing through the transparent member. The inner polished end of the transparent member includes a dielectric layer applied thereto which is selected to filter and reflect back into the heat sink at least some of the infrared components of the light emitting from the arc lamp. Most, if not all, of the ultraviolet component is filtered out by the transparent member. The light emitting from the outer end of the transparent member is thus absent both ultraviolet and infrared components for further transmission through the fiber optic bundle. An opaque enclosure, a fan for enhanced heat dissipation and additional light-containing and modifying elements are also provided.

15 Claims, 2 Drawing Sheets

FIBER OPTIC LIGHTING DEVICE

BACKGROUND OF THE INVENTION

This invention relates generally to a light source for illuminating optical fibers, and more particularly to a lighting device including an arc discharge lamp which provides light output for transmission along a fiber optic bundle or conduit and which is absent significant components of ultraviolet and infrared wave lengths.

Fiber optic bundles are utilized in a wide range of illumination devices and systems for delivering focused light to illuminate various objects for display purposes over an extended period of time. In such circumstances, it is desirable to illuminate these objects with a light emitting from the distal end of the fiber optic bundle which does not include either ultraviolet or infrared wave lengths within the visible light emanating from the fiber optic bundle. The absence of both ultraviolet and infrared components is desirable so as not to accelerate the physical deterioration of objects illuminated by the fiber optic bundle.

U.S. Pat. No. 5,016,152 to Awai is directed to a focused light source which provides an arc discharge lamp positioned within a reflector assembly for focusing light radiation from the lamp and selectively transmits and reflects desirable visible radiation and undesirable ultraviolet and infrared radiation, respectively. The primary purpose is to protect plastic optic fibers from damage. Because the Awai device includes a reflector to accomplish its purpose, a tremendous heat build-up occurs which shortens the life of the arc lamp. Further, the Awai devices does not truly eliminate all infrared radiation from the emanating light.

Other devices for producing a relatively ultraviolet- and infrared-free light utilize a halogen lamp in conjunction with one or more fiber optic bundles. However, these halogen-type lamps are of relatively short life, whereas an arc discharge lamp typically enjoys a useful life of in the range of 12,000 hours if in a properly cooled environment.

The present invention utilizes the longevity of arc discharge lamps in conjunction with a heat sink therearound for dissipating heat build-up. At least one rigid transparent cylindrical member is provided which is specially constructed to filter out ultraviolet wave lengths and to reflect back infrared wave lengths into the heat sink so that the light emitting from the end of the transparent member for use within a fiber optic bundle is substantially free of these undesirable light components within the light spectrum emanating from the arc lamp.

BRIEF SUMMARY OF THE INVENTION

This invention is directed to a fiber optic lighting device for providing a light source against and into one end of a fiber optic bundle for use. The device includes a long-life arc lamp which is operably connected within a tubular heat sink. At least one rigid transparent elongated, preferably cylindrical member having ground and polished ends is connected within a mating opening in the heat sink facing the arc lamp, light emitting from the arc lamp passing through the transparent member. The inner polished end of the transparent member includes a dielectric layer applied thereto which is selected to filter and reflect back into the heat sink at least some of the infrared components of the light emitting from the arc lamp. Most, if not all, of the ultraviolet component is filtered out by the transparent member. the light emitting from the outer end of the transparent member is absent both ultraviolet and infrared components for further transmission through the fiber optic bundle. An opaque enclosure, a fan for enhanced heat dissipation and additional light-containing and modifying elements are also provided.

It is therefore an object of this invention to provide an illuminating device for fiber optic bundles which produces visible light absent significant components of both ultraviolet and infrared.

It is another object of this invention to provide an illuminating device for fiber optic bundles utilizing an arc discharge lamp as the light source and to fully take advantage of the inherent longevity of this type of light source.

It is yet another object of this invention to conduct light from an arc discharge lamp to the end of a fiber optic device without the use of a reflector in blocking harmful ultraviolet and infrared radiation emanating from the fiber optic device for display of an object.

It is yet another object of this invention to collect and dissipate reflected infrared heat away from the arc discharge lamp of a device for illuminating fiber optic bundles.

In accordance with these and other objects which will become apparent hereinafter, the instant invention will now be described with reference to the accompanying drawings.

DETAILED DESCRIPTION OF THE INVENTION

Figure 1:
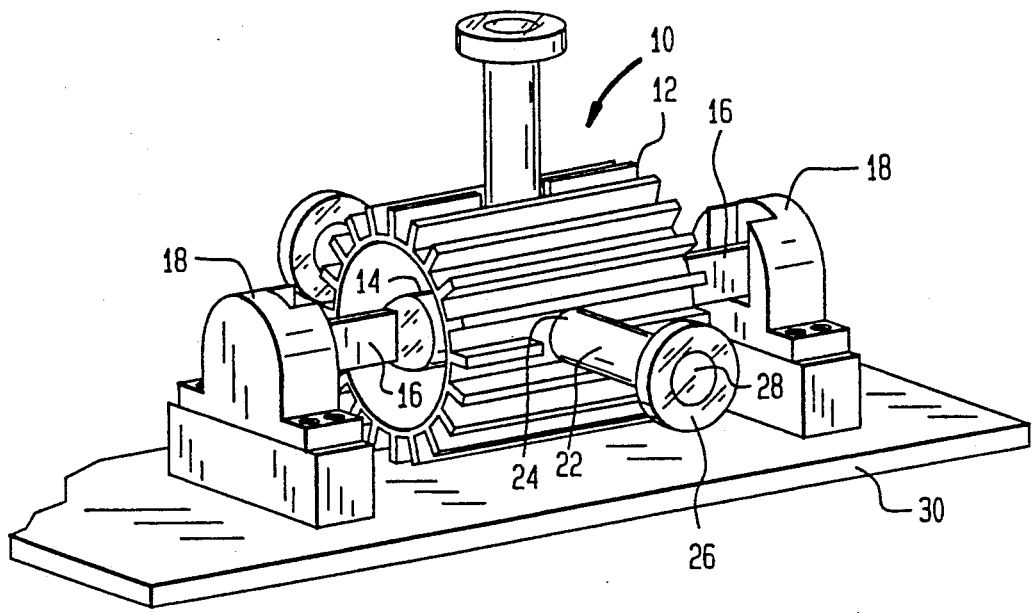
FIG. 1 is a perspective schematic view of one embodiment of the invention.

Referring now to the drawings, and particularly to FIG. 1, one embodiment of the invention is shown generally at numeral 10 and includes an extruded tubular aluminum outwardly finned heat sink 12 which is horizontally disposed atop a mounting platform 30. Positioned centrally within and along the length of heat sink 12 is a double ended arc-discharge lamp 14 having its end terminals 16 operably connected within sockets 38 of terminal blocks 18. These terminal blocks 18 are also connected to platform 30 as shown.

Figure 3:
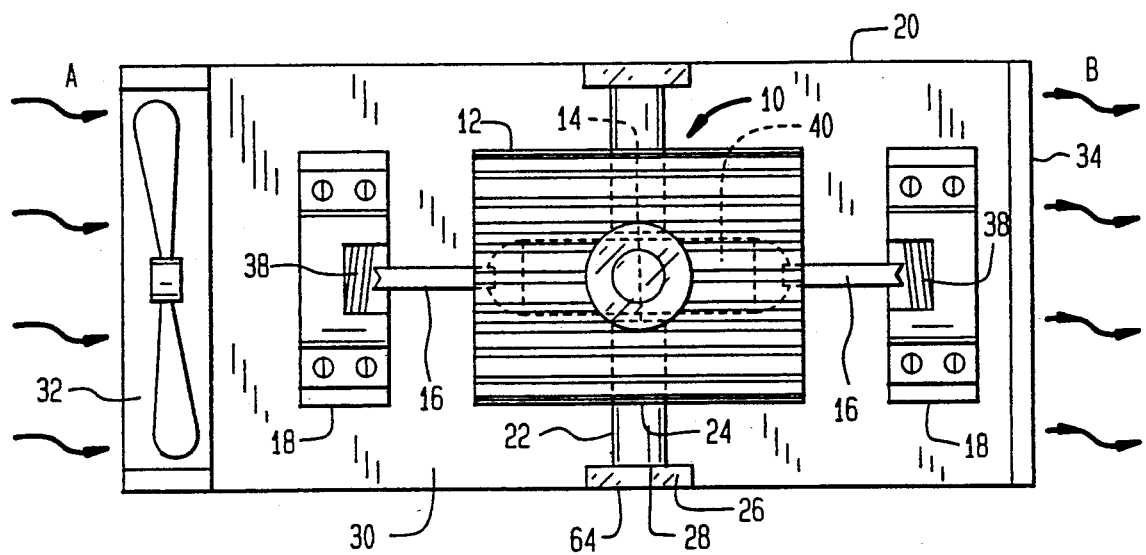
FIG. 3 is a top plan view of FIG. 2.

The device 10 also includes a plurality of rigid cylindrical transparent rods 22 which are connected adjacent their inner end within mating holes or ports 24 formed through the wall of heat sink 12. Each end of each transparent rod is ground parallel and polished to a suitable finish. As best seen in FIG. 3, the inner ends 40 of each of the transparent rods 22 are positioned in close proximity to arc lamp The inner ends of each of the transparent rods 22 are coated at 40 with a dielectric layer such as a hot mirror coating having a zero degree (0°) angle of incidence which is selected to reflect infrared in the wave length range of about 750 to 1200 nanometers (nm.). The full-spectrum light emitting from the arc lamp 14 includes both ultraviolet and infrared radiation in the wave length range of less than 450 (nm.) and greater than 750 (nm.), respectively, as well as light in the visible range. A portion of the undesirable infrared radiation is initially reflected back and prevented from being transmitted through each transparent rod 22 by the dielectric coating 40 infrared radiation is dissipated into heat sink 14 and then radiated into the surrounding air. The fins of heat sink 12 assist in this heat dissipation.

Transparent rod 22 is preferably formed of heat resistant glass such as "PYREX", an Owens Corning product. However, quartz glass will also serve the purpose of both transmitting the light passing through dielectric layer 40, while also absorbing the ultraviolet wavelength components in the range of less than 450 (nm.).

Therefore, the visible light emitting from the outer end 28 of transparent rods 22 is absent both ultraviolet radiation and infrared radiation up to about 1200 (nm.).

In order to remove further components of infrared radiation, an additional transparent disc 26 is also provided in this embodiment 10 which includes an additional hot mirror coating on the inner surface thereof which mates against the outer end 28. This "hot mirror coating" is selected also having a zero degree (0°) angle of incidence to reflect infrared radiation above 1200 (nm.). Again this infrared component is reflected back inwardly through each transparent rod 22 into the interior of heat sink 12 for dissipation.

Figure 2:
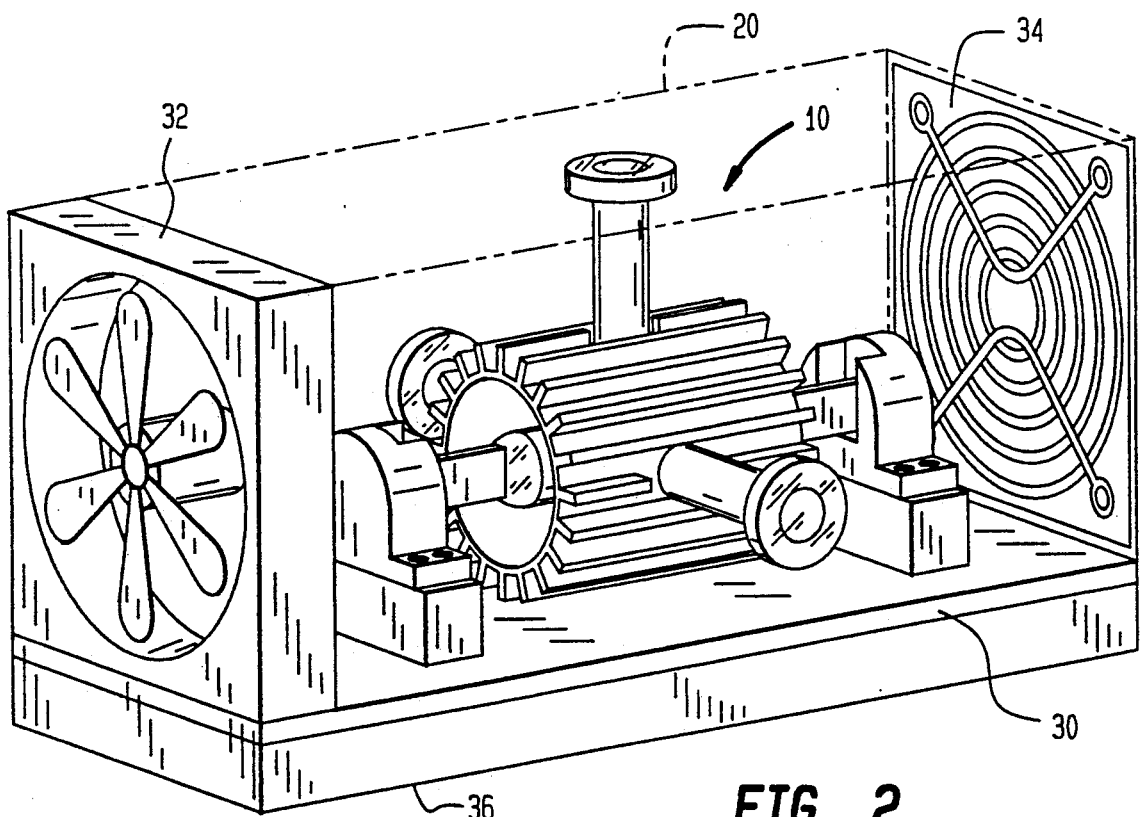
FIG. 2 is a perspective schematic view of FIG. 1 within an enclosure

Referring additionally to FIGS. 2 and 3, an enclosure 20 formed having opaque side and top panels is also provided so as to eliminate glare from arc lamp 14. Disposed at one end of enclosure 20 is a small axial flow fan 32 which introduces air into the interior of enclosure 20 to carry heat out through discharge grill 34.

Transparent mirror discs 26 are connected against the interior surface of the walls of enclosure 20 and aligned with an aperture therethrough shown typically at 64 in FIG. 3. A fiber optic bundle (not shown) may then be positioned against the exterior of enclosure 20 in alignment with each of the transparent rods 22 as desired.

To improve the efficiency of conducting visible light through each transparent rod 22, thin initialized aluminum coating is also deposited on the longitudinal cylindrical surface only thereof.

Figure 4:
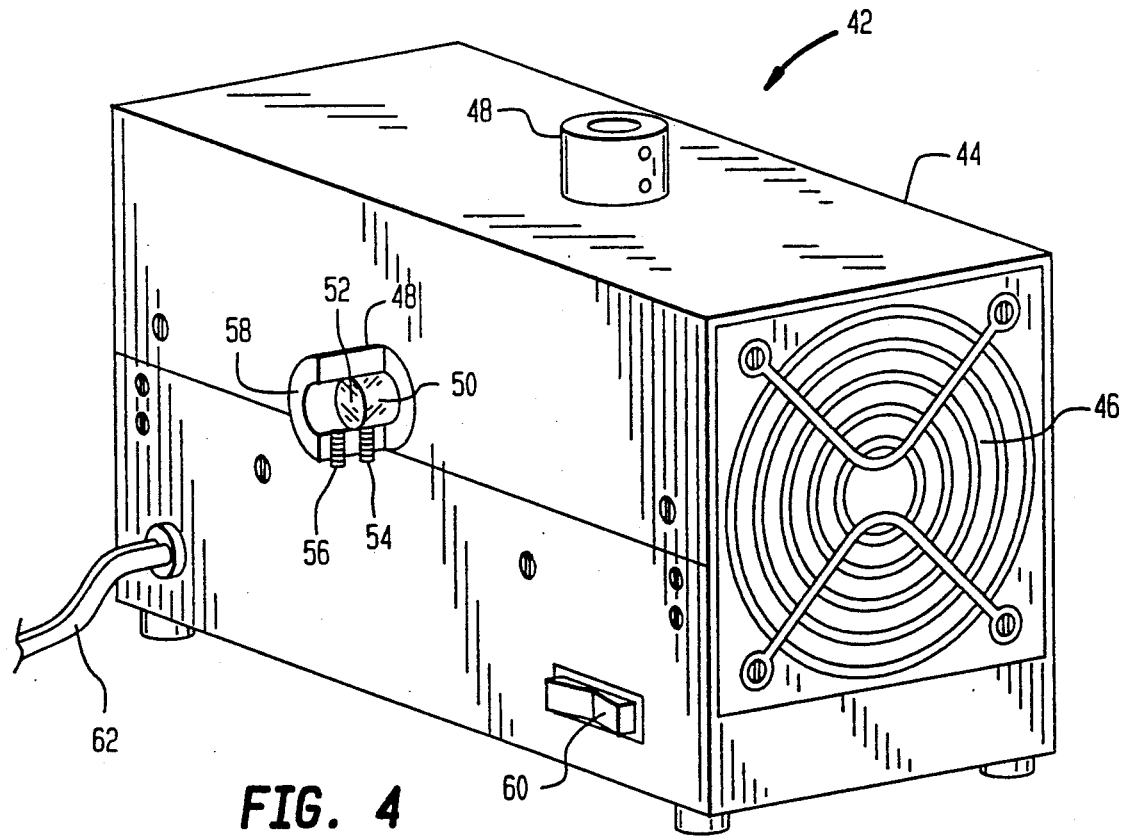
FIG. 4 is a perspective partially broken view of another embodiment of the invention showing the exterior thereof.

Referring additionally to FIG. 4, another embodiment of the invention is shown at numeral 42 and includes substantially all of the components as previously described within the interior thereof. An opaque enclosure 44 includes an air discharge grill 46 at one end and mating hole formed in the walls thereof and are connected within tubular enclosure 44. A set screw 54 retains this arrangement.

The fiber optic bundles (not shown) may each then be inserted into the remaining interior length 58 of one tubular coupling 48 and held in position and alignment directly against the outer end 52 of each transparent rod 50 by set screw 56.

The enclosure 44 also includes an on/off switch 60 which controllably applies electric power via electrical cable 62 to the arc discharge lamp 14 contained therein and as previously described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A fiber optic lighting device for providing a light source at an end of a fiber optic bundle, said lighting device comprising:
   an arc lamp operably connected and positioned within a tubular open-ended heat sink;
   a rigid transparent elongated member having ground and polished inner and outer ends and connected within a mating opening formed through a wall of said heat sink, said opening positioned facing said arc lamp;
   said transparent member extending laterally from said heat sink with said inner end adjacent said arc lamp such that light emitting from said arc lamp strikes said inner end;
   said inner end having a thin dielectric layer disposed thereon structured for reflecting at least a portion of the infrared wave lengths which emanate from said arc lamp back into said heat sink whereby light passing through and emitted from said end is absent said infrared wave lengths.

2. A fiber optic lighting device as set forth in claim 1, wherein:
   said dielectric layer includes a hot-mirror coating having an angle of incidence of about zero degrees (0°) and which reflects and does not transmit light emitting from said arc lamp in the wavelength range of between about 750 to 1200 (nm.).

3. A fiber optic lighting device as set forth in claim 2, wherein:
   said transparent member is cylindrical heat resistant glass.

4. A fiber optic lighting device as set forth in claim 1, said heat sink includes radially extending longitudinal fins for enhanced heat dissipation.

5. A fiber optic lighting device as set forth in claim 4, further comprising:
   a cooling fan positioned adjacent said arc lamp and said heat sink for blowing air over said arc lamp and heat sink.

6. A fiber optic lighting device as set forth in claim 1, wherein:
   said transparent member includes a thin metalized outer coating over substantially the entire length of said transparent member, but not over said inner and outer ends.

7. A fiber optic lighting device as set forth in claim 2, further comprising:
   a thin dielectric layer disposed on said outer end structured for reflecting a second portion of the infrared wave lengths which emanate from said arc lamp back into said heat sink;
   said second dielectric layer reflecting and not transmitting light emitting from said arc lamp in the light wavelength range of above 1200 (nm.).

8. A fiber optic lighting device as set forth in claim 5, further comprising:
   an opaque enclosure structured to house and support said lighting device;
   said cooling fan positioned at one end of said enclosure within an air intake formed in said enclosure, said mentioned for discharging heated air from said enclosure;
   said transparent member outer end extending through a wall of said enclosure providing access for positioning the fiber optic bundle end against said transparent member outer end.

9. A fiber optic lighting device as set forth in claim 8, further comprising:

a support collar connected to and extending outwardly from said enclosure wall structured for positioning and retaining the fiber optic bundle end against said transparent member outer end.

10. A fiber optic lighting device for providing a light source at comprising:

an end of a plurality of fiber optic conduits, said lighting device a double-ended arc lamp operably connected and positioned within a tubular open-ended heat sink;

a plurality of rigid transparent cylindrical elongated rods, each rod of said plurality of rods formed of heat-resistant glass having ground and polished inner and outer ends and connected within a separate mating opening formed through a wall of said heat sink, each said opening positioned facing said arc lamp;

each said transparent rod extending radially from said heat sink with each said inner end adjacent and facing said arc lamp such that light emitting from said arc lamp strikes each said inner end;

each said inner end having a thin multi-layer dielectric layer disposed thereon structured for reflecting at least a portion of the infrared wave lengths which emanate from passing through and emitted from each said outer end is absent said infrared wave lengths;

said dielectric layer being a hot-mirror coating having an angle of incidence of about zero degrees (0°) and which reflects and does not transmit light emitting from said arc lamp in the wavelength range of between about 750 to 1200 (nm.);

said heat sink including radially extending longitudinal fins for enhanced heat dissipation.

11. A fiber optic lighting device as set forth in claim 10, further comprising:

a cooling fan positioned adjacent said arc lamp and said heat sink for blowing air over said arc lamp and heat sink.

12. A fiber optic lighting device as set forth in claim 10, wherein:

each said transparent rod includes a thin metalized outer coating over substantially the entire length thereof, but not over said inner and outer ends thereof.

13. A fiber optic lighting device as set forth in claim 10, further comprising:

a thin dielectric layer disposed on each said outer end structured for reflecting a second portion of the infrared wave lengths which emanate from said arc lamp back into said heat sink;

said second dielectric layer reflecting and not transmitting light emitting from said arc lamp in the light wavelength range of above 1200 (nm.).

14. A fiber optic lighting device as set forth in claim 11, further comprising:

an opaque enclosure structured to house and support said lighting device;

said cooling fan positioned at one end of said enclosure within an air intake formed in said enclosure, said enclosure also including an air discharge grill positioned for discharging heated air from said enclosure;

each said transparent rod outer end extending through a wall of said enclosure providing access for positioning one fiber optic bundle end against each said transparent member outer end.

15. A fiber optic lighting device as set forth in claim 14, further comprising:

a support collar connected to and extending outwardly from said enclosure wall structured for positioning and retaining each fiber optic bundle end against one said transparent rod outer end.

* * * * *

UNITED STATES PATENT AND TRADEMARK OFFICE
CERTIFICATE OF CORRECTION

PATENT NO. : 5,111,367
DATED : May 5, 1992
INVENTOR(S) : David L. Churchill

It is certified that error appears in the above-identified patent and that said Letters Patent is hereby corrected as shown below:

Column 2, Line 61 after "lamp", insert -- 14 --.

Column 4, Line 33, after "1,", insert -- wherein: --.

Column 4, Line 62, delete "mentioned" and insert therefor -- enclosure also including an air discharge grill positioned --.

Column 5, Line 8, after "at", insert -- an end of a plurality of fiber optic conduits, said lighting device --.

Column 5, Lines 9 and 10, delete "an end of a plurality of fiber optic conduits, said lighting device".

Column 5, Line 27, after "from", insert -- said arc lamp back into said heat sink whereby light --.

Signed and Sealed this

Twenty-ninth Day of June, 1993

Attest:

MICHAEL K. KIRK

Attesting Officer

Acting Commissioner of Patents and Trademarks